US012755518B2

(12) United States Patent
Slossberg et al.

(10) Patent No.: US 12,755,518 B2
(45) Date of Patent: Oct. 6, 2026

(54) TECHNIQUES FOR CLASSIFYING CUSTOM OBJECT STATES IN VISUAL CONTENT

(71) Applicant: LUMANA INC., Sunnyvale, CA (US)

(72) Inventors: Ron Slossberg, Raanana (IL); Aviad Zabatani, Kfar Vitkin (IL); Noam Rotstein, Haifa (IL); Ofir Mulla, Talme Elazar (IL); Amit Bracha, Ramat Gan (IL); Ron Kimmel, Haifa (IL)

(73) Assignee: LUMANA, INC., Sunnyvale, CA (US)

( * ) Notice: Subject to any disclaimer, the term of this patent is extended or adjusted under 35 U.S.C. 154(b) by 271 days.

(21) Appl. No.: 18/539,885

(22) Filed: Dec. 14, 2023

(65) Prior Publication Data

US 2025/0200946 A1 Jun. 19, 2025

(51) Int. Cl.

| | |
|---|---|
| ***G06V 10/774*** | (2022.01) |
| ***G06V 10/26*** | (2022.01) |
| ***G06V 10/70*** | (2022.01) |
| ***G06V 10/764*** | (2022.01) |
| ***G06V 10/771*** | (2022.01) |
| ***G06V 20/70*** | (2022.01) |

(52) U.S. Cl.

CPC ............ *G06V 10/774* (2022.01); *G06V 10/26* (2022.01); *G06V 10/764* (2022.01); *G06V 10/771* (2022.01); *G06V 10/87* (2022.01); *G06V 20/70* (2022.01)

(58) Field of Classification Search

CPC .... G06V 10/774; G06V 10/26; G06V 10/764; G06V 10/771; G06V 10/87; G06V 20/70; G06V 10/82; G06V 20/52

See application file for complete search history.

(56) References Cited

U.S. PATENT DOCUMENTS

| | | | | |
|---|---|---|---|---|
| 10,573,134 | B1 | 2/2020 | Zalewski et al. | |
| 10,846,960 | B1 | 11/2020 | Lemberger et al. | |
| 11,273,343 | B2 | 3/2022 | Augustin et al. | |
| 11,727,479 | B2 | 8/2023 | Glaser et al. | |
| 2017/0148430 | A1* | 5/2017 | Lee | G10L 15/063 |
| 2020/0014888 | A1* | 1/2020 | Magal | G06V 10/82 |
| 2020/0202209 | A1* | 6/2020 | Mao | G06V 10/774 |
| 2021/0042663 | A1* | 2/2021 | Agustin | G06V 20/70 |
| 2021/0110439 | A1* | 4/2021 | Jayne | G06V 10/82 |
| 2021/0279475 | A1 | 9/2021 | Tusch et al. | |
| 2021/0407090 | A1* | 12/2021 | Li | G06V 10/25 |
| 2023/0154167 | A1* | 5/2023 | Li | G06V 10/774 382/159 |

(Continued)

*Primary Examiner* — Ming Y Hon

(74) *Attorney, Agent, or Firm* — M&B IP Analysts, LLC

(57) ABSTRACT

A system and method for training a classifier. A method includes identifying instances of an object shown in visual content items by applying at least one first machine learning model to the visual content items. The at least one first machine learning model is trained to classify visual content with respect to whether the visual content shows the object. Training samples selected from at least a portion of the visual content items are labeled with respective state labels indicating states of the instances of the object shown in the visual content items. A second machine learning model is trained using a training set including the training samples and the respective state labels. The second machine learning model is trained to classify visual content with respect to states of the object shown in the visual content.

18 Claims, 7 Drawing Sheets

(56) References Cited

U.S. PATENT DOCUMENTS

| | | | | |
|---|---|---|---|---|
| 2023/0196792 | A1* | 6/2023 | Saggu | G06T 7/74<br>382/100 |
| 2023/0402164 | A1* | 12/2023 | Bhardwaj | G16H 50/20 |
| 2024/0000414 | A1* | 1/2024 | Abdolmanafi | G06V 10/82 |
| 2024/0111868 | A1* | 4/2024 | da Silva | G06F 21/566 |
| 2024/0212377 | A1* | 6/2024 | Mulla | G06V 30/19173 |
| 2024/0220848 | A1* | 7/2024 | Mahmud | G06N 20/00 |
| 2024/0338826 | A1* | 10/2024 | Arcadu | G06F 18/2414 |
| 2025/0021423 | A1* | 1/2025 | Zhu | H04L 41/16 |
| 2025/0104394 | A1* | 3/2025 | Qiu | G06F 40/284 |
| 2025/0131604 | A1* | 4/2025 | Ungureanu | G06T 11/00 |
| 2025/0292554 | A1* | 9/2025 | Kokubo | G06V 10/761 |

* cited by examiner

TECHNIQUES FOR CLASSIFYING CUSTOM OBJECT STATES IN VISUAL CONTENT

TECHNICAL FIELD

The present disclosure relates generally to classifying visual content using machine learning, and more specifically to classifying states of custom-defined objects shown in visual content.

BACKGROUND

Video monitoring technologies are being used for many different purposes, such as home monitoring (e.g., video doorbells which watch for activity outside of a door), vehicle monitoring (e.g., systems which monitor video for parking or other vehicle-related violations), hospitality (e.g., video monitoring inside of hotels), and many more. In order to accomplish certain goals of different video monitoring technologies, it is important to be able to identify relevant information reflected in visual content.

As a particular example of a use of video monitoring technologies requiring identifying an object shown in visual content and its state, door monitoring solutions attempt to identify when doors are left open unintentionally. To this end, such door monitoring solutions attempt to determine whether a door is open or closed and for how long. For example, if it is determined that a door has been left open for more than 1 minute, it may be determined that the door was left open unintentionally and an alert may be sent (e.g., to a user device) to inform a homeowner or other person to close the door. Alternatively, it may be desirable to analyze video afterward in order to determine times when a door is open. For example, if a person is able to trespass in a building because a door was left open, it may be desirable to identify when the door was left open and/or for how long in order to determine a cause of the problem.

Door monitoring technologies face challenges in accurately determining the state of a door. Some particular challenges for doors include situations where a door is semi-transparent, differences in door shapes and sizes (e.g., as compared to doors observed during training), defining what constitutes open or closed, and occlusions due to people and objects passing in front of the door. Similar challenges may exist for other solutions involving custom-defined objects or states.

Existing solutions for overcoming these challenges simply require more training of machine learning models used for monitoring, either in the form of explicit targeted examples (e.g., of particular object shapes and sizes or of different states), or simply a wider variety of examples. However, such explicit or variety of samples are not always readily available, and would otherwise require a significant amount of manual work in order to create. Moreover, certain challenges like semi-transparent objects are difficult for existing machine learning solutions to consistently and accurately identify even with more training.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for training a classifier. The method comprises: identifying instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object; labeling a plurality of training samples selected from at least a portion of the plurality of visual content items with respective state labels indicating states of the instances of the object shown in the plurality of visual content items; and training a second machine learning model using a training set including the plurality of training samples and the respective state labels, wherein the second machine learning model is trained to classify visual content with respect to states of the object shown in the visual content.

Certain embodiments disclosed herein also include a non-transitory computer readable medium having stored thereon causing a processing circuitry to execute a process, the process comprising: identifying instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object; labeling a plurality of training samples selected from at least a portion of the plurality of visual content items with respective state labels indicating states of the instances of the object shown in the plurality of visual content items; and training a second machine learning model using the training set including a plurality of training samples and the respective state labels, wherein the second machine learning model is trained to classify visual content with respect to states of the object shown in the visual content.

Certain embodiments disclosed herein also include a system for training a classifier. The system comprises: a processing circuitry; and a memory, the memory containing instructions that, when executed by the processing circuitry, configure the system to: identify instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object; label a plurality of training samples selected from at least a portion of the plurality of visual content items with respective state labels indicating states of the instances of the object shown in the plurality of visual content items; and train a second machine learning model using a training set including the plurality of training samples and the respective state labels, wherein the second machine learning model is trained to classify visual content with respect to states of the object shown in the visual content.

Certain embodiments disclosed herein include the method, non-transitory computer readable medium, or system noted above or below, wherein the at least one first machine learning model includes a basic model and an advanced model, wherein the basic model has a domain which is a subset of a domain of the advanced model, further including or being configured to perform the following step or steps: applying the basic model to the plurality of visual content items; selecting a portion of the plurality of visual content items based on outputs of the basic model; and applying the advanced model to the selected portion of the plurality of visual content items, wherein the plurality of training samples are selected based on outputs of the advanced model.

Certain embodiments disclosed herein include the method, non-transitory computer readable medium, or system noted above or below, further including or being configured to perform the following step or steps: applying a student model in order to select a plurality of training candidates; applying a teacher model to the plurality of training candidates, wherein a domain of the student model is a subset of the domain of the teacher model, wherein the teacher model is trained to classify objects shown in visual content; labeling the plurality of training candidates based on outputs of the teacher model; and training the basic model using the labeled plurality of training candidates.

Certain embodiments disclosed herein include the method, non-transitory computer readable medium, or system noted above or below, further including or being configured to perform the following step or steps: removing at least one portion from the plurality of visual content items, wherein removing the at least one portion includes segmenting the plurality of visual content items, wherein the plurality of training samples is the at least one removed portion.

Certain embodiments disclosed herein include the method, non-transitory computer readable medium, or system noted above or below, wherein the removed at least one portion includes only pixels showing the object.

Certain embodiments disclosed herein include the method, non-transitory computer readable medium, or system noted above or below, further including or being configured to perform the following step or steps: determining, via a calibration process, a threshold for the second machine learning model, wherein the second machine learning model is trained to output a confidence score for each classification output by the second machine learning model, wherein the threshold is used to determine whether each classification output by the second machine learning model is to be used during subsequent processing.

Certain embodiments disclosed herein include the method, non-transitory computer readable medium, or system noted above or below, further including or being configured to perform the following step or steps: querying a language model based on a textual input indicating potential states of the object and the plurality of training samples, wherein the language model is connected to at least one visual foundation model, wherein the language model returns text indicating a state of the object shown in each of the plurality of training samples, wherein the plurality of training samples are labeled with the text returned by the language model.

Certain embodiments disclosed herein include the method, non-transitory computer readable medium, or system noted above or below, wherein the plurality of visual content items is a plurality of first visual content items, further including or being configured to perform the following step or steps: applying the second machine learning model to a second visual content item; and determining a state of the object shown in the second visual content item based on outputs of the second machine learning model.

Certain embodiments disclosed herein include the method, non-transitory computer readable medium, or system noted above or below, wherein the object is a door, wherein the state labels include door open and door closed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
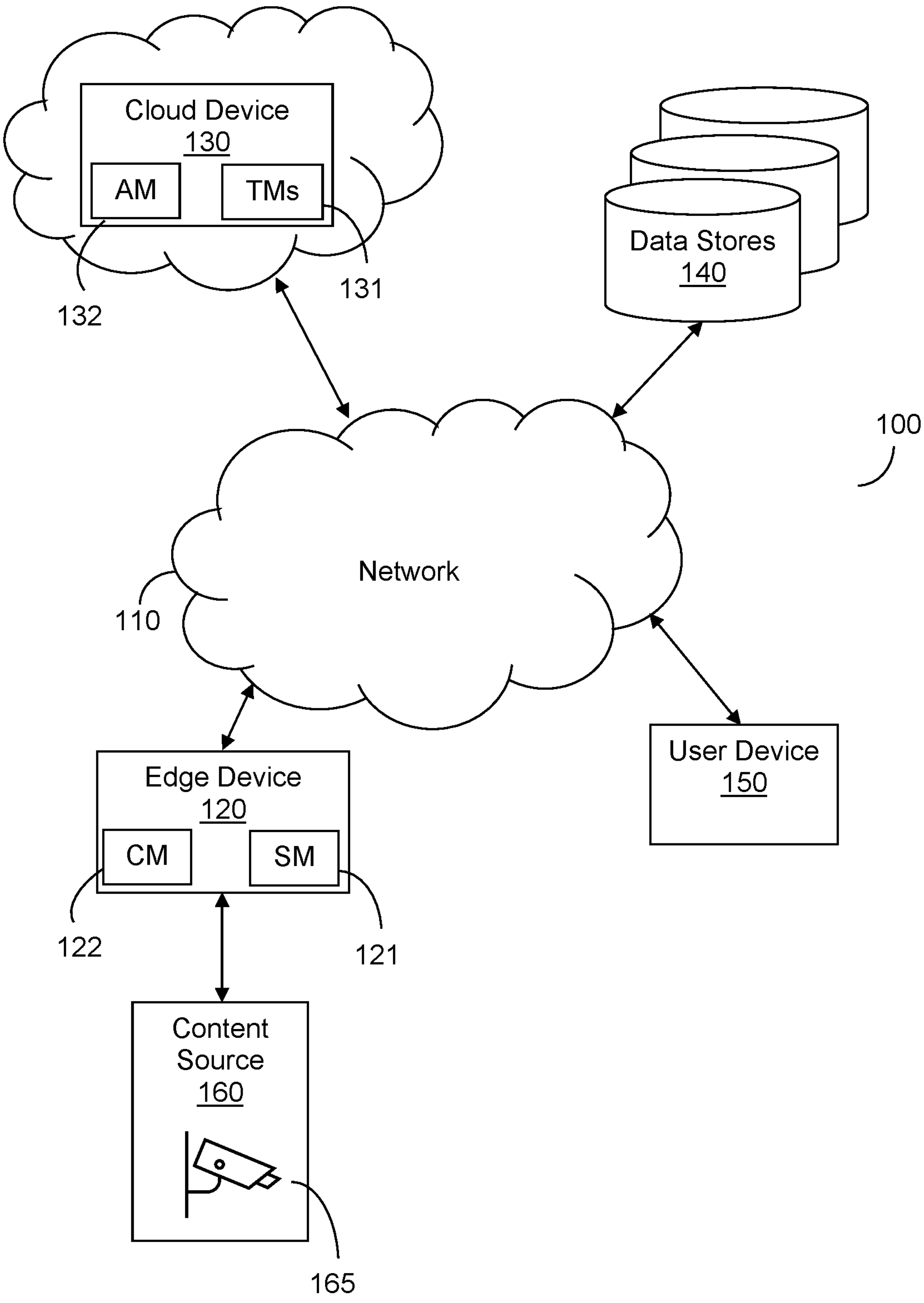
FIG. 1 is a network diagram utilized to describe various disclosed embodiments.

The various disclosed embodiments include methods and systems for classifying custom object states in visual content such as, but not limited to, door open/closed states in video content. Various embodiments described herein include methods for classifying custom object states, for labeling visual content to support training a classifier, for creating a custom model to be used in classifier training, and the like.

In various embodiments, classification is used to classify custom object states such as whether a door is open or closed. In this regard, it is noted that states of three-dimensional objects such as door open or door closed presents various technical challenges for visual processing and machine learning. In particular, different kinds of doors may appear differently, which makes naïve learning of features from example doors unlikely to accurately detect door states when applied to new visual content. Further, objects which may be semi-transparent such as doors (for example, glass doors) are challenging to visually distinguish for machine learning models, which poses challenges both in identifying the outline of doors shown in visual content as well as in determining what state those doors are in (for example, open or closed). Moreover, occlusions due to the presence of people or other objects in images may make object recognition more challenging. In this regard, it has been identified that a single machine learning process is unsuitable for many applications involving custom-defined states of three-dimensional objects, and that a multi-stage training process may allow for overcoming at least some of these challenges.

In an embodiment, a subprocess including at least two stages is used in order to train a classifier to determine custom object states such as, but not limited to, door open or door closed. In a first stage, content items such as video frames are labeled. More specifically, the content items are labeled with preliminary results determined by an advanced model based on selections of portions of visual content made using a basic model trained to perform custom object detection. In a further embodiment, the basic model is a machine learning model having a domain that is a subset of a domain used by the advanced model. In a second stage, the labeled content items are used as training data to train a classifier in order to classify visual content into custom object states.

In some embodiments, the custom model used during the labeling process is created using transfer learning. In such embodiments, a student machine learning model is deployed and used to identify training candidates, for example, images which may include custom objects such as doors. A teacher machine learning model is used to generate predictions for the training candidates, for example, labels of whether an image includes a door. The training candidates are labeled with the teacher prediction labels and used to train the custom model.

The embodiments disclosed herein provide a multi-stage machine learning process in which machine learning models are applied during a first stage in order to generate labels for use in labeling training sample content, and the labeled samples are used for training a classifier. In particular, using basic and advanced models as described during the first stage allows for efficiently and accurately determining labels, thereby improving the training of the classifier during the second stage (i.e., such that the resulting classifier more accurately classifies visual content with respect to the custom object states) while reducing consumption of computing resources used for labeling during the first stage.

Moreover, in some embodiments, segmentation is performed during the first stage in order to further reduce the amount of data to be used for training, for example, by segmenting content with respect to custom objects such as doors and utilizing only segmented content containing the custom objects as training inputs to be labeled. A weak classifier or set of heuristic rules may be applied to custom object segmentations in order to label the custom object segmentations with respect to custom object states, and those labeled custom object segmentations may be utilized as the training data for use in training the classifier during the second stage. By only providing the classifier training data with examples of the custom object, even with only preliminary labels, the classifier can be trained more efficiently and accurately.

The various ways in which different aspects of the two-stage process described herein can be utilized to improve accuracy of classifiers allow for improving performance to a degree that enables detecting technically challenging object states such as whether a door is open or closed. In particular, use of the first stage to narrow down and initially label training inputs allows for a more sophisticated analysis as compared to naively training a classifier based on the features extracted directly from the visual content. In this regard, it is noted that certain objects such as doors are hard to capture structurally via machine learning, particularly when the objects are semi-transparent.

The embodiments described herein therefore allow for overcoming these technical challenges in order to accurately identify custom object states, and particularly for semi-transparent objects. Additionally, a classifier trained as described herein can be applied to new environments (including new instances of custom objects such as new doors other than the doors shown in visual content used for the training) in order to accurately classify states of custom objects in those new environments.

In this regard, it is noted that naively training a classifier based on features extracted directly from visual content (e.g., images of features) might yield a classifier that is capable of detecting states for a known custom object (e.g., a custom object that was shown in visual content used for the training) shown at a known viewpoint (e.g., a particular angle of a camera used to capture images among the visual content used for the training), but that such a naively trained classifier would fail to consistently and accurately determine the custom object state for new custom objects or for known custom objects shown from different viewpoints. The embodiments described herein can therefore be used to enable accurate state detection for new environments and viewpoints.

Moreover, various disclosed embodiments leverage a distributed computing architecture that uses a basic model (i.e., a model whose domain is a subset of the domain of an advanced model) in order to perform initial identification of potential custom objects to be further processed by the advanced model. The advanced model may be deployed remotely from the basic model. Because the domain of the basic model is smaller than that of the advanced model, using the basic model requires less processing power than using the advanced model. Additionally, since various disclosed embodiments are applicable to visual content analyzed remotely using an advanced model, only analyzing some of the visual content using the advanced model allows for reducing the amount of visual data such as video which must be transmitted over one or more networks. Consequently, using the basic model to perform initial identification allows for reducing the total amount of data to be processed using the advanced model, thereby conserving computing resources.

FIG. 1 shows an example network diagram 100 utilized to describe the various disclosed embodiments. In the example network diagram 100, an edge device 120, a cloud device 130, a plurality of data stores (hereinafter referred to individually as a data store 140 and collectively as data stores 140, merely for simplicity purposes), and a user device 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the edge device 120 and the cloud device 130 is configured to perform a respective portion of the embodiments described herein. More specifically, the edge device 120 is configured to apply a student model (SM) 121 and a custom model (CM) 122 to features obtained from content, and the cloud device 130 is configured to apply teacher models (TMs) 131 and an advanced model 132 during training and utilization, respectively. In various embodiments and as depicted in FIG. 1, the edge device 120 and the cloud device 130 are deployed remotely from each other.

During training, the custom model 122 is created using outputs of the teacher models 131 when applied to select portions of content acting as portions of content acting as training candidates. Specifically, the student model 121 is initially configured to select content to be uploaded to the teacher models 131 using one or more search parameters (e.g., the search configuration parameters 213, FIG. 2A) such as, but not limited to, search parameters defining random sampling parameters or search parameters defining other conditions for selecting content such as detection of motion corresponding with the capturing of the content. To this end, the training candidates may be selected from among content from a content source 160. The training candidates may be labeled using prediction labels output by the teacher models 131 in order to create labeled content for use in training the student model 121.

A model is trained using the labeled training candidates produced by the teacher models 131 in order to create a custom model 122. The custom model 122 is sent to the edge device 120 for deployment as a basic model which performs initial analysis to determine whether to further analyze portions of content by an advanced model (AM) 132 deployed in the cloud device 130.

The data stores 140 store content which may be used during training, for example, in order to select training candidates to be used for creating the custom model 125. Such content may include, for example, visual content illustrating objects to be analyzed. As a non-limiting example, the visual content may include video or image content showing a buildings, where some portions of the video or images show doors which might be recognized via the custom model 125 and are analyzed further by the advanced model 132 to classify objects shown in the visual content, and in particular to classify objects including custom objects.

The user device (UD) 150 may be, but is not limited to, a personal computer, a laptop, a tablet computer, a smartphone, a wearable computing device, or any other device capable of receiving and displaying notifications, portions of visual content, metadata, and the like. In various implementations, modified content created by the edge device 120 or the cloud device 130 may be sent to the user device 150, and the user device 150 may be configured to display a dashboard containing such modified content.

In various embodiments, the user device 150 receives user inputs through one or more user interfaces (not shown). These user inputs include inputs defining custom objects, custom object states, or both, as well as criteria for selecting training candidates such as, but not limited to, a content sample showing the custom object, samples showing different custom object states, analysis parameters defining how portions of content are to be analyzed when identifying instances or states of the custom object, search configuration information defining criteria for selecting training candidates, and the like.

The content source 160 includes (as shown) or is communicatively connected to (not shown) one or more sensors 165 such as, but not limited to, cameras. In accordance with various implementations, the content source 160 may be deployed "on-edge," that is, locally with the edge device 120 (e.g., through a direct or indirect connection such as, but not limited to, communication via a local network, not shown in FIG. 1). Accordingly, the content captured or otherwise collected by the content source 160 may be analyzed initially using the custom model 122 at the edge, and then only certain portions of content determined to be of interest using the custom model 122 may be sent to the advanced model 132 for further processing. Further, in some implementations, the content used during training and from which the training candidates are selected may be captured by the sensors 165 or may otherwise be provided by the content source 160.

It should be noted that various disclosed embodiments discussed with respect to FIG. 1 are described with respect to a cloud device 130 which is deployed remotely from an edge device 120, but that the disclosed embodiments are not necessarily limited as such. The systems utilizing the student model and the teacher models from the training may be deployed locally to each other, and may communicate over a local connection (e.g., via a local network). Likewise, the systems using the custom model and the advanced models may be deployed locally to each other without departing from the scope of the disclosure. The disclosed embodiments may still yield savings on processing when a first stage of processing is performed using the custom model, and using the custom model to decide which portions of visual content to send to the advanced model may reduce use of networking or other communication resources even when the systems storing and using the different models are deployed locally.

Figure 2A:
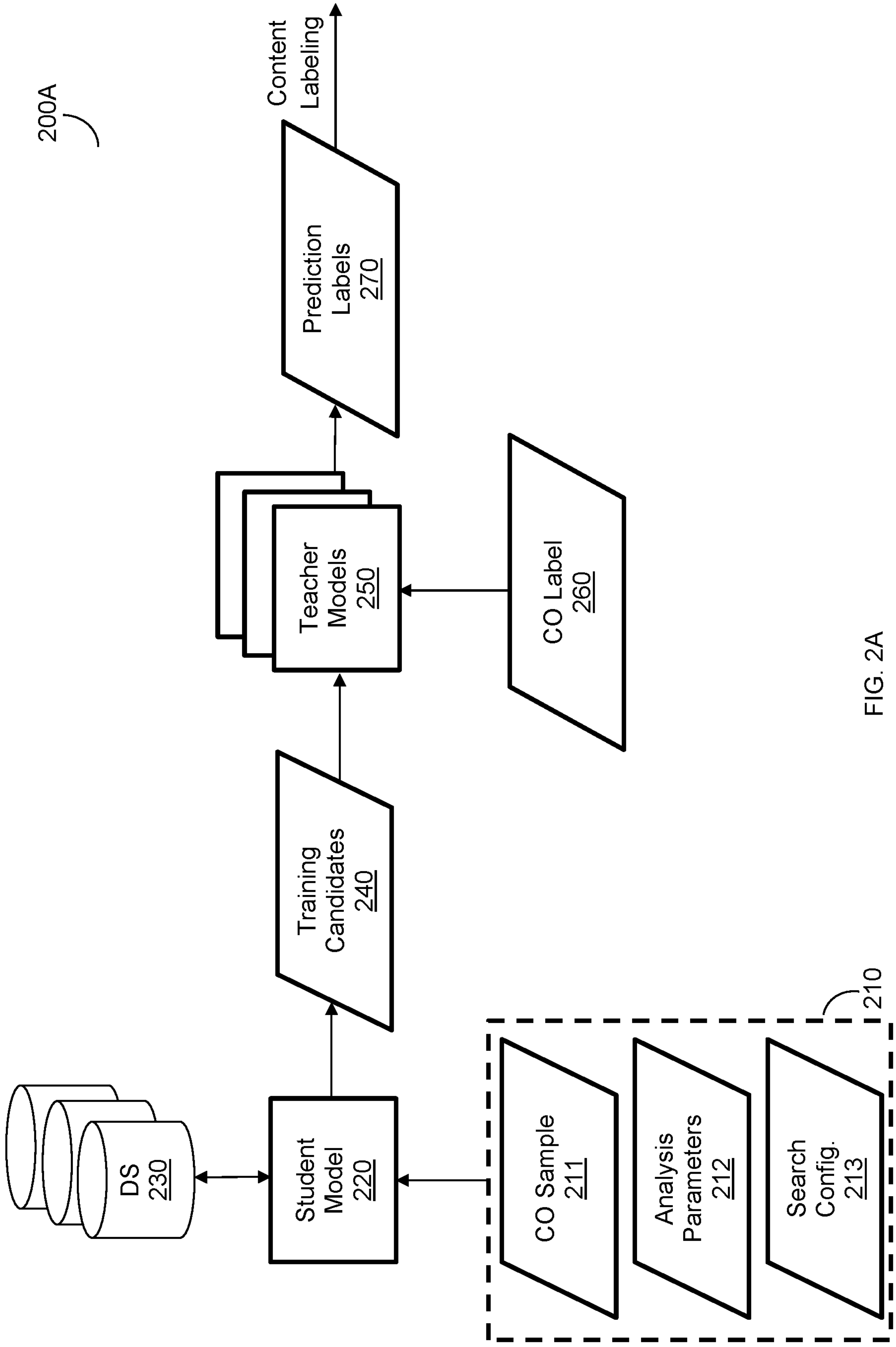
FIG. 2A is a flow diagram illustrating training of machine learning models for custom object detection in a hybrid machine learning architecture in accordance with various disclosed embodiments.
Figure 2B:
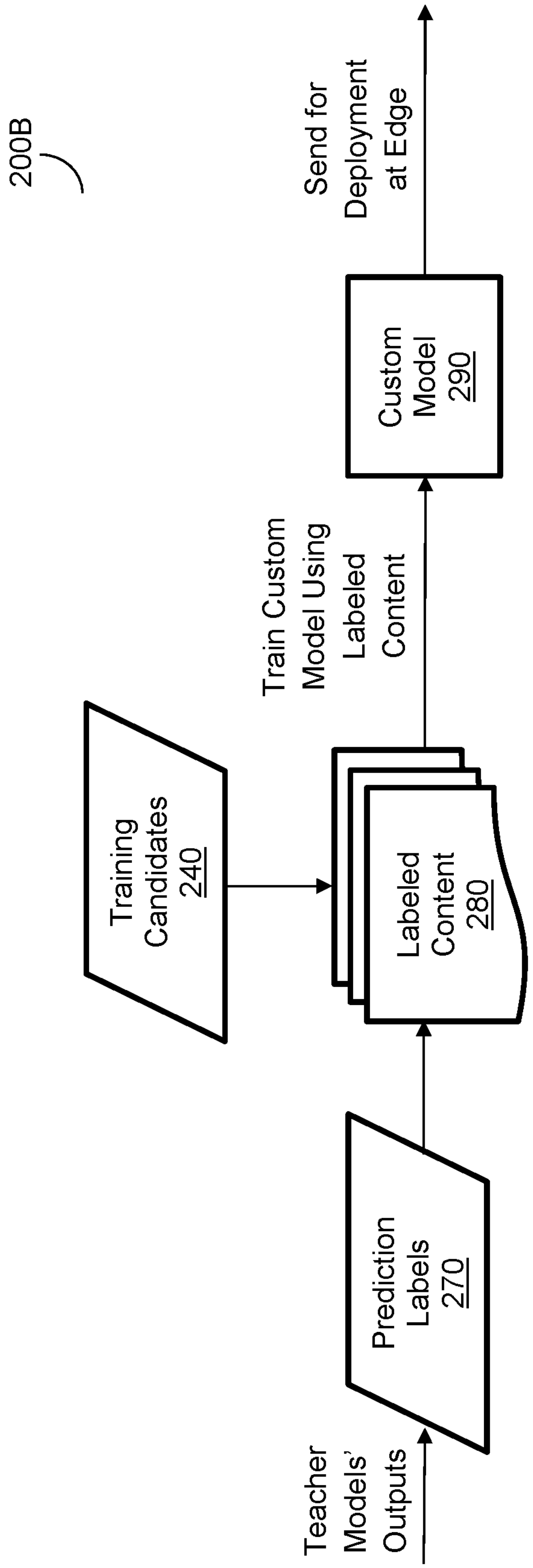
FIG. 2B is a flow diagram illustrating creation and deployment of a custom model in accordance with various disclosed embodiments.

FIGS. 2A and 2B are flow diagrams 200A and 200B, respectively, illustrating creation and deployment of custom models in accordance with various disclosed embodiments. The process depicted in the flow diagrams 200A and 200B may be utilized when training a custom machine learning model to detect custom object states as discussed herein.

FIG. 2A is a flow diagram illustrating a first part of the process in which prediction labels are generated for training candidates. As depicted in FIG. 2A, a set of customization inputs 210 are provided to a student model 220. The customization inputs 210 may include, but are not limited to, a custom object (CO) sample 211, analysis parameters 212, and search configuration (config.) parameters 213. The customization inputs 210 may be provided as user inputs.

The sample 211 is a sample of content such as an image showing the custom object. In accordance with various disclosed embodiments, the sample may further reflect a custom object state such as, but not limited to, door open or door closed.

The analysis parameters 212 may be utilized to define potential areas of interest within content such as, but not limited to, parameters indicating that the entire content should be analyzed for the custom object or parameters defining certain zones within content to be analyzed for the custom object.

The search configuration parameters 213 define sampling parameters, search terms, or other parameters to be used in order to obtain and identify training candidates. For example, the search configuration parameters 213 may include a randomized sampling scheme (e.g., time intervals at which random samples should be selected from among content) or motion-based sampling parameters (e.g., parameters indicating that samples should be taken at times where motion is detected). The search configuration parameters 213 may further include source identifiers indicating sources from which content should be obtained.

Using the search configuration parameters 213, the student model 220 is configured to obtain content and to select training candidates 240 from among the content. To this end, the student model 220 may access one or more data sources (DS) 230, for example data sources indicated by source identifiers among the search configuration parameters 213. The student model 220 takes samples in the form of the training candidates 240 from among the data obtained from the data sources 230. In various embodiments, the training candidates 240 include the custom object sample 211 which was provided to the student model 220.

The training candidates 240 are uploaded or otherwise provided to teacher models 250. The teacher models 250 also provided a custom object (CO) label 260, which is a custom-defined label to be used for labeling instances of the custom object identified in content, and may be provided as user inputs. The teacher models 250 are configured to output predictions, for example in the form of prediction labels 270, for respective portions of content. As a non-limiting example, the custom object label 260 is output as a prediction label 270 indicating a predicted custom object state for each portion of content showing the custom object.

In at least some implementations, the custom object label 260 may be an instance of labels associated with other content showing examples of the user-defined custom object such as, but not limited to, sample content obtained via the Internet. As a non-limiting example, the custom object label 260 may be determined by retrieving sample images showing the custom object and analyzing the tags of such images to identify a tag which should be used as the custom object label 260 (e.g., a tag which appears on every sample, the majority of samples, or otherwise meeting some criteria relative to the total set of samples).

FIG. 2B shows the creation of a custom model 290 using the outputs of the teacher models 250. As noted above, the teacher models outputs prediction labels 270. The prediction labels 270 are combined with their respective training candidates 240 in order to produce labeled content 280. The labeled content 280 may be used to train the teacher models 250, and the trained teacher models 250 are utilized to train a custom model 290, for example using one or more transfer learning techniques. Once the custom model 290 is created through this training, the custom model 290 is sent for deployment, for example at the edge device 120, FIG. 1.

Figure 3:
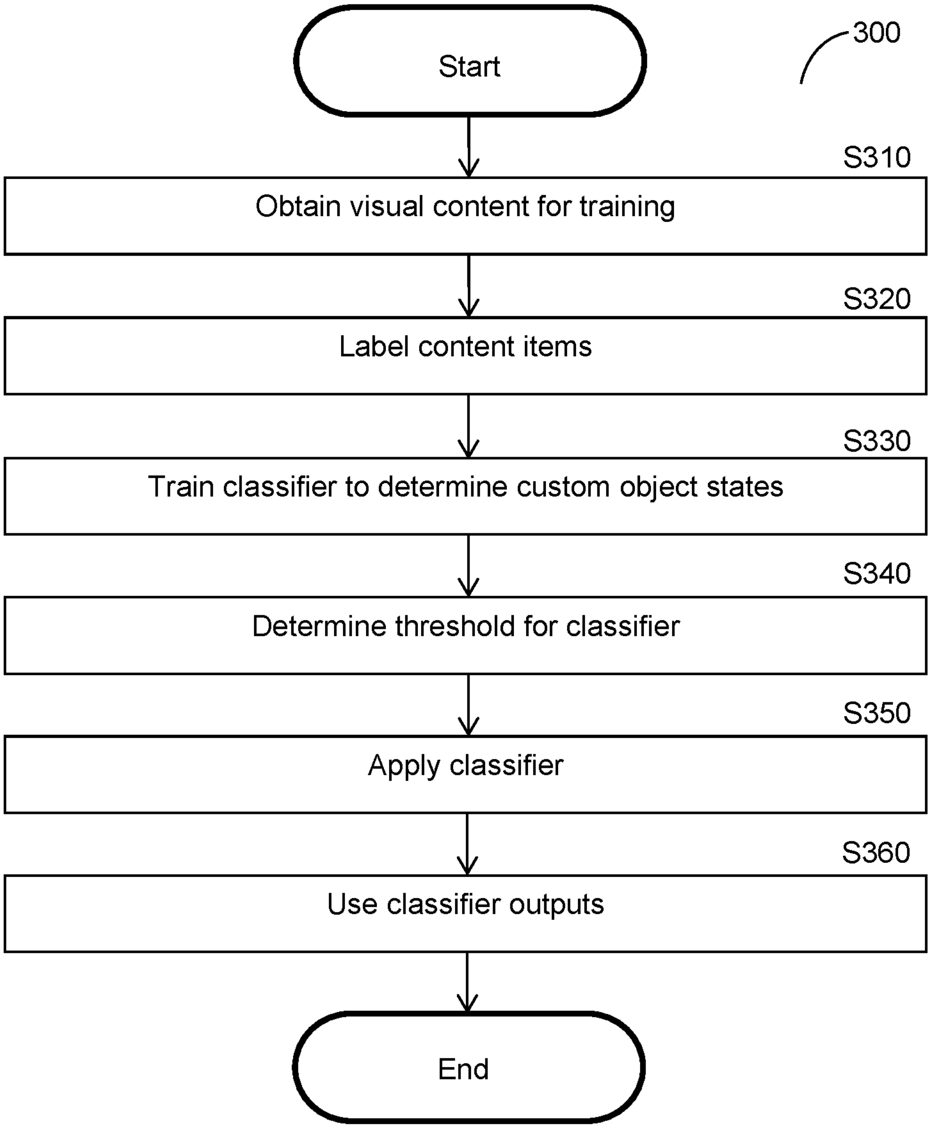
FIG. 3 is a flowchart illustrating a method for classifying custom object states in visual content according to an embodiment.

FIG. 3 is a flowchart 300 illustrating a method for classifying custom object states in visual content according to an embodiment. In an embodiment, the method is performed by the edge device 120, FIG. 1.

At S310, visual content to be utilized for training is obtained. The visual content may include, but is not limited to, video, images, both, and the like. At least some of the visual content shows examples of custom objects, where each instance of a custom object shown in the visual content may demonstrate a respective custom object state. As a non-limiting example, the visual content may include video showing buildings, at least some of which shows doors in either open or closed states.

At S320, content items or portions of the content items among the visual content are labeled. The content items may include, for example but not limited to, video frames. In an embodiment, the labels include custom object state labels indicating custom object states of custom objects shown in the content items. In a further embodiment, the labels also include custom object labels indicating whether each content item shows a custom object. In an embodiment, the labeling is performed as described further below with respect to FIG. 4.

As noted further below with respect to FIG. 4, in some embodiments, portions of the content items may be labeled. When portions of the content items are labeled, the portions may include, but are not limited to, segments. In a further embodiment, only portions of the content items showing custom objects may be labeled with custom object state labels, and only those custom object state labeled portions of content items are used during subsequent training in order to reduce usage of computing resources and improve accuracy of the resulting trained model.

In this regard, it is noted that certain kinds of custom objects are particularly difficult to analyze visually using machine learning models, and accurately classifying states of those custom objects presents a significant technical challenge. Using a two-stage process including an item-by-item (i.e., per content item such as per frame) labeling stage and a classifier training stage as discussed herein allows for improving the accuracy of the resulting classifier which allows the classifier to effectively determine custom object states even for technically challenging custom objects. As a non-limiting example, semi-transparent custom objects such as glass doors are very difficult for machine learning models to recognize structurally such that naively training a classifier based on examples including such semi-transparent doors in open or closed states would result in a classifier that fails to accurately classify doors as open or closed. As another non-limiting example, cameras used to capture video showing doors may be deployed at different angles, and a machine learning model trained on examples of doors in open or closed states at different angles may fail to accurately classify subsequent visual content with respect to open or closed state when presented with a new video frame showing a door at a different angle than angles of doors represented among the training data.

Using an initial labeling stage prior to training the classifier may allow for leveraging other models to identify doors or other custom objects in visual content, to separate (e.g., via segmentation) portions of the visual content showing the custom objects from portions which do not show the custom objects, or both, which in turn allows for providing a more finely tuned training set as inputs to the training of the classifier, thereby improving the classifier's ability to classify custom object states even for custom objects presenting such technically challenging characteristics such as semi-transparency or differences in viewpoints or angles of cameras capturing visual content.

At S330, a classifier is trained to determine custom object states using the labeled content items or portions of content items. In some embodiments, only portions of the content items showing custom objects are used as the labeled training inputs. In a further embodiment, only segments containing pixels determined to show part of a custom object are used, with each such segment being labeled with a respective custom object state label indicating the state of the custom object shown in the segment. As a non-limiting example, segments from video frames showing doors which are labeled with a state of the doors (e.g., door open or door closed) are used as training inputs to train the classifier.

The custom object states may be user-defined states defined with respect to objects and may be or may include, but are not limited to, custom states defined for custom objects, custom states for other objects, both, and the like. The custom states may be reflected in orientations, colors, edges, or other visually distinguishing features of objects as shown in visual content. As a non-limiting example, for custom objects in the form of doors, the custom object states may include "door open" and "door closed," where the same door appears visually different (e.g., with respect to reflections of light, orientation of hinges, etc.) depending on whether it is open or closed.

In some embodiments, the classifier is trained using the labeled content items or portions of content items as inputs for a supervised machine learning algorithm. In other embodiments, the training set used as inputs may include the labeled content items or portions of content items as well as some unlabeled content items or portions of content items, and the training set is therefore used as inputs for a semi-supervised machine learning algorithm.

At S340, one or more thresholds are determined for the classifier. In an embodiment, the thresholds are used to determine whether to determine whether outputs of the classifier (i.e., classifications output by the classifier) are to be used during subsequent processing. To this end, such a threshold may be a confidence threshold. In this regard, it is noted that at least some classifier machine learning models output a confidence score for any classifications that the models output. The threshold may be a threshold confidence level such that, if the confidence score for a given classification is below the threshold confidence level, then the custom object state may be determined as either indeterminate or otherwise not determined to be that classification. As a non-limiting example, if a threshold confidence level is determined to be 0.8 for custom object state of door open, then a door is determined to be open only when the confidence score for a "door open" classification is at least 0.8.

In an embodiment, determining the post-training threshold may include applying the trained classifier to the training inputs which were labeled in order to determine classifications for the training inputs and comparing the classifications to the labels in order to determine a ratio of correct predictions to incorrect predictions, a ratio of correct predictions to all predictions, and the like. In such an embodiment, the threshold may be determined based on such a ratio or otherwise based on the comparison between output classifications and known labels for a given set of training inputs. In a further embodiment, determining the post-training threshold may include analyzing a receiver operating characteristics (ROC) curve generated based on the performance of a binary classifier model.

In a further embodiment, the thresholds are determined using a calibration process, for example, a calibration process designed such that the model having the calibrated thresholds will achieve at least one predetermined requirement. As a non-limiting example, such a predetermined requirement may be a predetermined minimal precision value. In yet a further embodiment, the calibration process may utilize an evenly calibration data set, where the evenly distributed calibration data set includes an equal number of samples for each potential output as compared to each other potential output (i.e., the number of samples of one output is equal or approximately equal to the number of samples of each other output represented in the calibration data set). In an example implementation, the calibration data set may be a labeled training set, and the thresholds may be determined such that they are in the middle of a range of potential values.

At S350, the trained classifier is applied to subsequent visual content in order to output classifications indicating predictions related to the custom object states. As noted above, the classifier may further output confidence scores indicating a degree of confidence that the output classifications are correct, and those confidence scores may be compared to confidence thresholds in order to determine whether each classification should be used.

At S360, the classifier outputs are provided for or otherwise utilized during subsequent processing. As a non-limiting example, the classifier outputs may be utilized to determine whether a door is open or closed and, if the door is open, an alert may be generated.

In a further embodiment, the subsequent use may utilize the classifier outputs for different content items (e.g., video frames) in combination. As a non-limiting example, a particular custom object state (e.g., door open) may be determined for a series of video frames when that custom object state is observed in at least a predetermined threshold number of sequential frames (e.g., 10 frames in a row are labeled as "door open") or predetermined amount of time (e.g., frames which collectively are taken from at least 5 seconds of video are labeled as "door open"). In this regard, it is noted that using custom object states (or lack thereof) across multiple content items may allow for further improving accuracy of identification of states of custom objects shown in visual content by further guarding against false positives due to, for example, a misclassification of a single frame.

Figure 4:
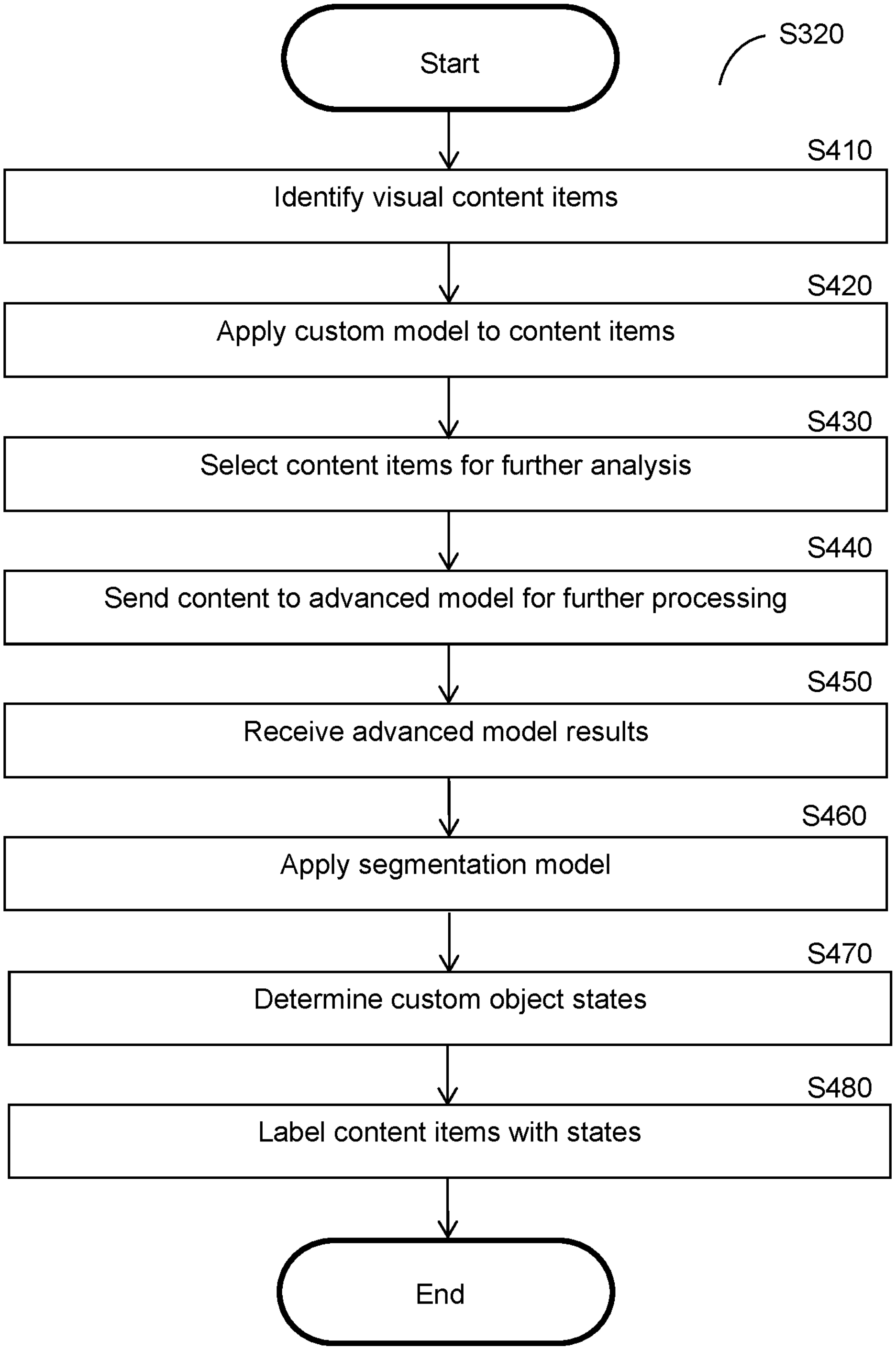
FIG. 4 is a flowchart illustrating a method for labeling visual content items according to an embodiment.

FIG. 4 is a flowchart S320 illustrating a method for labeling visual content items according to an embodiment.

At S410, visual content items to be labeled are identified. As a non-limiting example, a video may include various video frames, and the video frames of the video may be identified as content items to be labeled.

At S420, a custom model is applied to the content items. In an embodiment, applying the custom model results in at least a classification for each content item. In a further embodiment, the classification for each content item indicates whether the content item shows a predetermined custom object.

In an embodiment, the custom model is a basic model having a domain which is a subset of a domain of an advanced model. In this regard, the basic model may be applied as part of an initial analysis that is less computing-intensive than an analysis performed using the advanced model. Based on the initial analysis, content items may be selected for further analysis by the advanced model.

At S430, some or all of the content items are selected for further analysis. In an embodiment, content items which are selected for further analysis include content items showing a predetermined custom object which the custom model is trained to identify. As a non-limiting example, video frames showing doors may be identified based on outputs of the custom model indicating whether different portions of video show doors, and the video frames showing the doors are selected for further analysis.

At S440, the selected content items are sent to an advanced model for further processing. The advanced model is configured to analyze the selected content items with more granularity in order to determine, for example, portions of the content items showing the predetermined custom object or otherwise to more accurately determine whether each content item or portion of a content item shows the custom object. As a non-limiting example where the content items include video frames and the predetermined custom object is a door, the advanced model may output classifications for pixels in each video frame indicating whether each pixel shows a door such that the classifications for each frame collectively indicate which portions of the frame show a door.

At S450, results are received from the advanced model. As noted above, the results may include classifications for portions of the content items indicating whether each portion shows a custom object.

At S460, a segmentation model is applied to the visual content based on the results from the advanced model in order to produce segments. Each segment may be, for example but not limited to, a segment showing a custom object or a segment not showing the custom object. As a non-limiting example for detecting doors, pixels may be indicating in the outputs from the advanced model, and segments containing groups of pixels showing a door are determined as door segments (i.e., custom object segments showing doors) while segments containing groups of pixels which do not show a door are determined as non-door segments (i.e., segments which do not show a custom object in the form of a door).

In an embodiment, the segments are produced such that the segments exclude people, other objects (i.e., objects other than the custom objects), or other occlusions. As noted above, the advanced model may return a pixel-by-pixel or other finer granularity classifications, which in turn may be utilized to produce segments that only include pixels showing the custom objects. In a further embodiment, pixels showing other objects blocking the custom object or otherwise pixels within an outer boundary of a segment determined as a custom object segment may be replaced with placeholder pixels labeled as pixels of door segments.

At S470, custom object states are determined. In an embodiment, S470 includes analyzing segments showing custom object in order to determine custom object states for the respective object shown in each segment. In an embodiment, S470 includes applying a classifier machine learning model trained to identify custom object states (e.g., based on labeled training data including state labels indicating states of custom objects shown in respective training visual content or training portions of visual content). In another embodiment, S470 includes applying a set of custom object state identification rules based on, for example, pixels surrounding the segments of the custom objects.

In some embodiments, determining the custom object states may include querying a large language model (LLM) which is connected to one or more visual foundation models (i.e., a large neural network model trained on large amounts of image data) in order to request visual analysis of visual content with respect to custom object states, for example, based on user inputs indicating the custom object states. As a non-limiting example, a user may provide textual inputs stating "determine whether doors are open or closed," and that text may be used along with the content items to be labeled as a query to a LLM connected to a visual foundation model such that the LLM and visual foundation model return textual outputs indicating whether each content item shows a door open or closed. Those textual outputs may, in turn, be utilized to label the content items.

In this regard, it is noted that manual labeling of images or video frames is a burdensome, time-consuming process which is subject to human error. A human performing such manual labeling would observe each frame and decide a custom object state for any custom objects shown in the frame. Using a LLM or otherwise using large neural network models allows for leveraging such large models in order to at least partially automate labeling in a manner which is different from the process that would be performed by a human performing manual labeling. The results will be more consistent due to objective standards applied by such large models, and the objectivity can be further improved using large models with reduced or no artificially injected variance. Once a threshold number of samples are labeled using the large model, those labeled samples may be used to train a classifier as discussed above. The classifier may operate on a smaller feature set than such a large model and therefore require fewer computing resources to use, thereby conserving computing resources as compared to using such large models for each and every visual content item to be classified with respect to custom object states.

At S480, content items or portions thereof are labeled based on the determined custom object states. More specifically, content items containing custom object segments (i.e., segments showing a custom object) may be labeled with respect to the custom object state of the custom object shown in each content item, or the custom object segments may be labeled with respect to the custom object state of the custom object shown in each segment. The labeled content items or portions of content items (e.g., segments) may be utilized for training a classifier, for example as discussed above with respect to S430.

In addition to reducing the amount of content to be processed using the advanced model, determining and labeling content items with respect to custom object states only for content items previously determined to show instances of the custom object using a basic model as discussed above further reduces the amount of processing needed for labeling.

Further, in at least some embodiments, only segments showing instances of the custom objects are labeled with custom object states. In a further embodiment, this subset of the segments which are labeled is provided for use as labeled training segments during subsequent training instead of providing all of the segments. Only providing this subset of segments showing examples of the custom object in different states allows for reducing the amount of data processed during the subsequent training, and may further improve the accuracy of the resulting machine learning model by providing higher granularity training inputs (i.e., samples showing specific portions of visual content showing the custom objects as examples of custom object states rather than entire frames or other full visual content items, only part of which show the custom objects).

Figure 5:
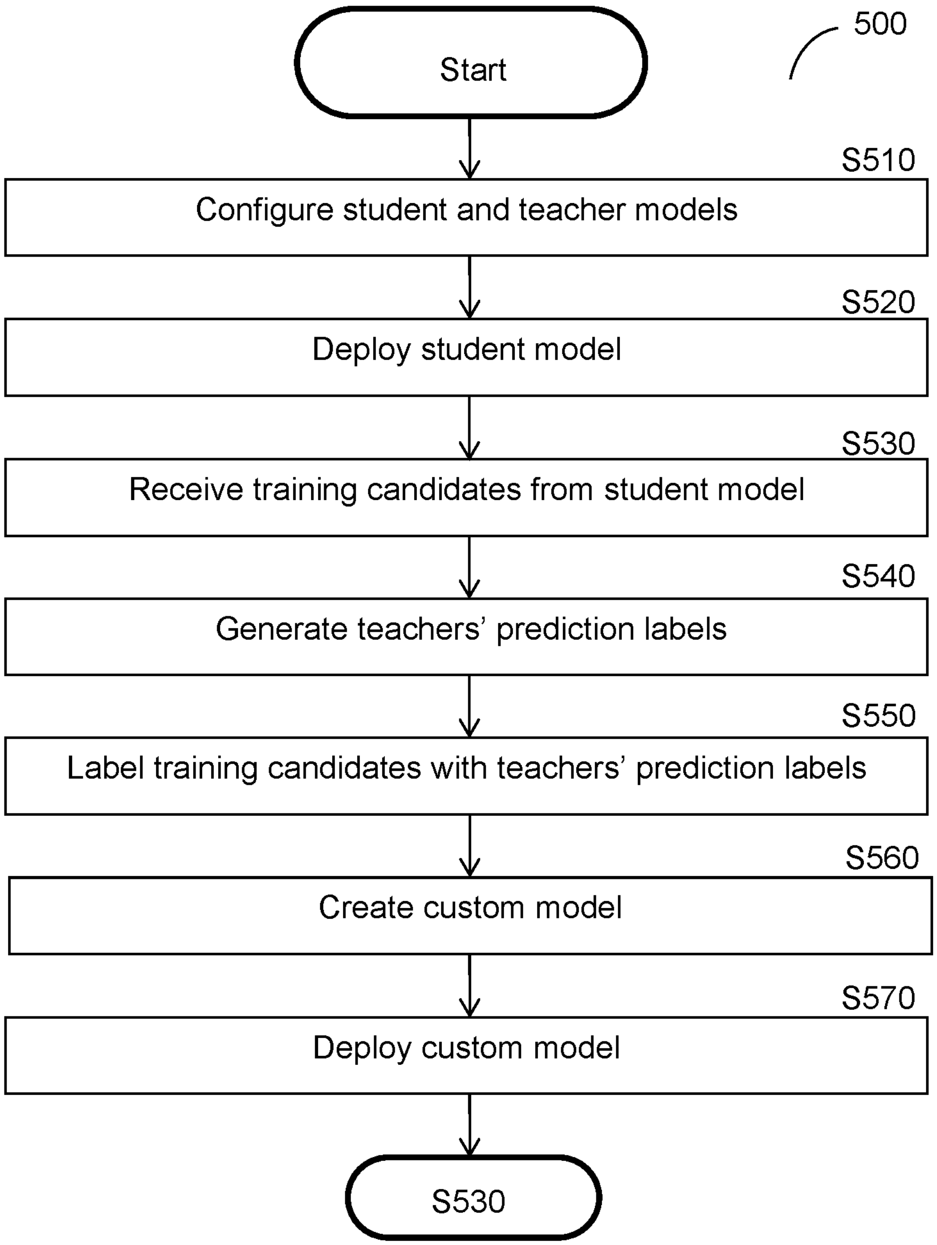
FIG. 5 is a flowchart illustrating a method for creating a custom model using transfer learning according to an embodiment.

FIG. 5 is a flowchart 500 illustrating a method for creating a custom model according to an embodiment. In an embodiment, the method is performed by the cloud device 130, FIG. 1.

At S510, student and teacher models are configured. Each of the student and teacher models is a machine learning model configured to output predictions for portions of content. In an embodiment, the teacher model is a classifier model trained via supervised machine learning using a training set including example features of content and respective labels representing known classifications. In another embodiment, the student model is initially configured to classify portions of content as either training candidates or not training candidates based on a sampling scheme or other parameters for selecting training candidates provided as user inputs such as the search configuration parameters 213, FIG. 2A.

The teacher model is configured with a first domain, i.e., a first set of potential values that are recognized by the teacher model. The potential values recognized by the teacher model are values which can be input to the teacher models in order to produce teacher predictions, for example, values which correspond to variables within the teacher models. The initial configuration of the student model is based on a second domain, i.e., a second set of potential values that are recognized by the student model. In an embodiment, the second domain of the student model is a subset of the first domain of the teacher models. As a non-limiting example, the student model may be configured only to classify objects shown in images into one or more types of objects (e.g., container or not container), while the teacher models may be configured both for such object type classification and to classify other characteristics of objects shown in the images such as custom object states of objects shown in the images.

At S520, the student model is sent for deployment at an edge device (e.g., the edge device 120, FIG. 1). Once deployed at the edge device, the student model is used to select training candidates from among content as described above.

At S530, training candidates selected by the student model are received from the student model. The training candidates may be identified based on outputs of the student model, for example, outputs of certain classes which are predetermined to be potentially interesting and therefore candidates for further analysis. For example, outputs of classes corresponding to objects for which custom object states to be identified, It should be noted that the training candidates received from the student model are selected automatically and without requiring human intervention. By using the student model to select the content for further analysis during the training, such selection can be performed without requiring selection by a human operator. Moreover, since the student model is used for selection without requiring a human involved, privacy of the data can be preserved during the training process.

At S540, teacher prediction labels are generated based on teacher predictions for the obtained training content. In an embodiment, the teacher prediction labels include one or more labels corresponding to each portion of the training content. In an embodiment, S540 includes applying the teacher models to the training candidates selected by applying the student model as described above in order to generate a set of teacher predictions. For example, the teacher predictions may include, but are not limited to, predictions of certain classifications for respective portions of the training content features, percentages indicating a likelihood of each classification for each portion of the training content features, or both. In accordance with various disclosed embodiments, at least some of the labels output by the teacher models are custom object state labels representing respective custom object states of objects identified by a user. The labels output by the teacher models may further include custom object labels representing a custom object identified by a user.

At S550, the training candidates are labeled with their respective teacher prediction labels. The result is a set of labeled content.

At S560, a custom model is created using the labeled content. The custom model may be a machine learning classifier trained to output classification predictions including, but not limited to, custom object predictions indicating whether a portion of content shows a custom object. To this end, S560 includes providing the labeled content or features extracted from the labeled content as a training data set to a training program used for training the custom model. In accordance with various disclosed embodiments, the custom model may have a domain (i.e., a set of potential values that are recognized by the custom model) which is a subset of the domain of the teacher models, of an advanced model, or both. Accordingly, the custom model may perform a limited analysis with respect to this domain subset, and may send content for further processing with respect to the full domain by the advanced model.

In an embodiment, the custom model is trained such that the custom model is configured to detect both custom objects corresponding to the custom object labels and one or more predetermined legacy objects known to the teacher models (i.e., one or more types of objects that the teacher models have been previously trained to detect). That is, the custom model may be trained to detect other items aside from just the new custom objects.

In a further embodiment, the labeled content used for creating the custom model is a limited set of content from among the training candidates. More specifically, the labeled content used for creating the custom model may include a number of labeled training candidates that is below a threshold proportion of a total number of training candidates. In this regard, it is noted that, in at least some implementations, having too high of a proportion of labeled candidates may interfere with the training process and decrease the accuracy of the model. More specifically, when the custom model is trained to detect both custom objects and previous non-custom objects, training the custom model using a disproportionate number of samples of the custom object may bias the model in a manner that makes detection of the previous non-custom objects less accurate. Limiting the proportion of labeled content used for creating the custom model therefore allows for ensuring that the accuracy of the model is maintained, particularly when the custom model is trained to detect both custom and non-custom content.

At S570, the custom model is sent for deployment. The custom model may be sent, for example, to the edge device 120, FIG. 1. Once deployed at its destination, the custom model may be used to make basic predictions about content such as whether the content tentatively appears to include the custom object. Portions of content determined to show the custom object using the outputs of the custom model may be sent for further analysis by an advanced model as described herein.

Custom object tracking using hybrid machine learning, including training a custom object classifier machine learning model using transfer learning, which may be utilized in accordance with various disclosed embodiments is described further in U.S. patent application Ser. No. 18/186,517, assigned to the common assignee, the contents of which are hereby incorporated by reference.

Figure 6:
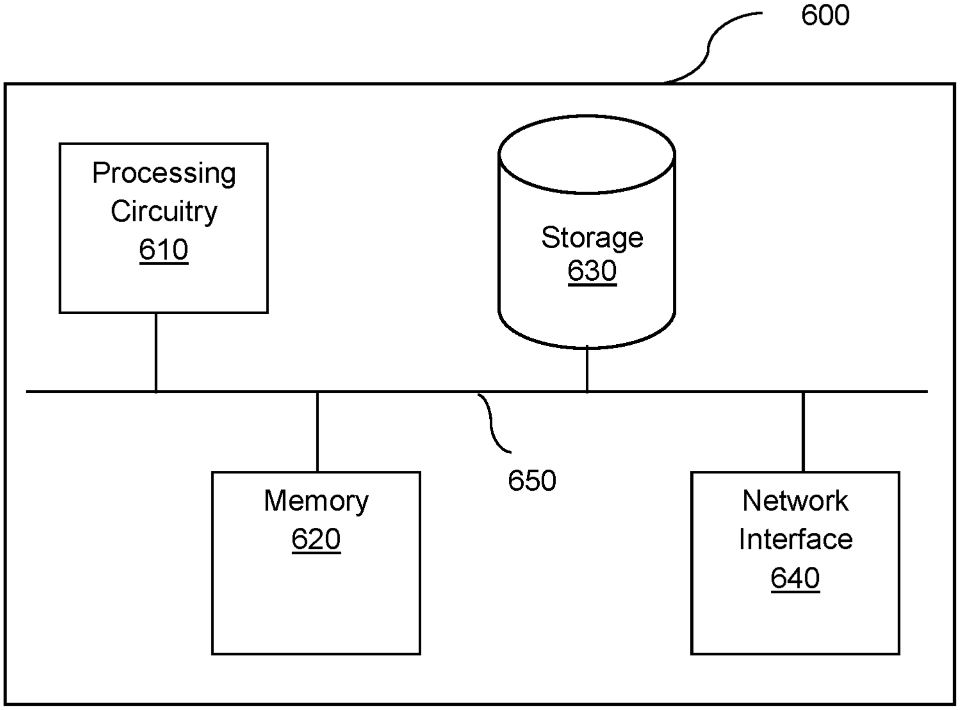
FIG. 6 is a schematic diagram of a hardware layer which may be utilized according to any of the disclosed embodiments.

FIG. 6 is a schematic diagram of a hardware layer 600 which may be utilized according to any of the disclosed embodiments. The hardware layer 600 includes a processing circuitry 610 coupled to a memory 620, a storage 630, and a network interface 640. In an embodiment, the components of the hardware layer 600 may be communicatively connected via a bus 650. A hardware layer including the components of the hardware layer 600 may be utilized to realize the edge device 120, the cloud device 130, or both, FIG. 1.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the hardware layer 600 to communicate with, for example, the edge device 120, the cloud device 130, the data stores 140, the user device 150, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for training a classifier, comprising:

identifying instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object, wherein the at least one first machine learning model includes a basic model and an advanced model, wherein the basic model has a domain which is a subset of a domain of the advanced model, wherein applying the at least one first machine learning model to the plurality of visual content items further comprises:

applying the basic model to the plurality of visual content items;

selecting a portion of the plurality of visual content items based on outputs of the basic model; and applying the advanced model to the selected portion of the plurality of visual content items, wherein the plurality of training samples is selected based on outputs of the advanced model;

labeling a plurality of training samples selected from at least a portion of the plurality of visual content items with respective state labels indicating states of the instances of the object shown in the plurality of visual content items; and training a second machine learning model using a training set including the plurality of training samples and the respective state labels, wherein the second machine learning model is trained to classify visual content with respect to states of the object shown in the visual content.

2. The method of claim 1, further comprising:

applying a student model in order to select a plurality of training candidates;

applying a teacher model to the plurality of training candidates, wherein a domain of the student model is a subset of the domain of the teacher model, wherein the teacher model is trained to classify objects shown in visual content;

labeling the plurality of training candidates based on outputs of the teacher model; and training the basic model using the labeled plurality of training candidates.

3. The method of claim 1, further comprising:

removing at least one portion from the plurality of visual content items, wherein removing the at least one portion includes segmenting the plurality of visual content items, wherein the plurality of training samples is the at least one removed portion.

4. The method of claim 3, wherein the removed at least one portion includes only pixels showing the object.

5. The method of claim 1, further comprising:

determining, via a calibration process, a threshold for the second machine learning model, wherein the second machine learning model is trained to output a confidence score for each classification output by the second machine learning model, wherein the threshold is used to determine whether each classification output by the second machine learning model is to be used during subsequent processing.

6. The method of claim 1, wherein labeling the plurality of training samples further comprises:

querying a language model based on a textual input indicating potential states of the object and the plurality of training samples, wherein the language model is connected to at least one visual foundation model, wherein the language model returns text indicating a state of the object shown in each of the plurality of training samples, wherein the plurality of training samples are labeled with the text returned by the language model.

7. The method of claim 1, wherein the plurality of visual content items is a plurality of first visual content items, further comprising:

applying the second machine learning model to a second visual content item; and determining a state of the object shown in the second visual content item based on outputs of the second machine learning model.

8. The method of claim 1, wherein the object is a door, wherein the state labels include door open and door closed.

9. The method of claim 1, wherein each of the domain of the basic model and the domain of the advanced model is a set of values recognized by the respective model.

10. A non-transitory computer readable medium having stored thereon instructions for causing a processing circuitry to execute a process, the process comprising:

identifying instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object, wherein the at least one first machine learning model includes a basic model and an advanced model, wherein the basic model has a domain which is a subset of a domain of the advanced model, wherein applying the at least one first machine learning model to the plurality of visual content items further comprises:

applying the basic model to the plurality of visual content items;

selecting a portion of the plurality of visual content items based on outputs of the basic model; and applying the advanced model to the selected portion of the plurality of visual content items, wherein the plurality of training samples is selected based on outputs of the advanced model;

labeling a plurality of training samples selected from at least a portion of the plurality of visual content items with respective state labels indicating states of the instances of the object shown in the plurality of visual content items; and training a second machine learning model using a training set including the plurality of training samples and the respective state labels, wherein the second machine learning model is trained to classify visual content with respect to states of the object shown in the visual content.

11. A system for training a classifier, comprising:

a processing circuitry; and a memory, the memory containing instructions that, when executed by the processing circuitry, configure the system to:

identify instances of an object shown in a plurality of visual content items, wherein identifying the instances of the object shown in the plurality of visual content items further comprises applying at least one first machine learning model to the plurality of visual content items, wherein the at least one first machine learning model is trained to classify visual content with respect to whether the visual content shows the object, wherein the at least one first machine learning model includes a basic model and an advanced model, wherein the basic model has a domain which is a subset of a domain of the advanced model, wherein the system is further configured to:

apply the basic model to the plurality of visual content items;

select a portion of the plurality of visual content items based on outputs of the basic model; and apply the advanced model to the selected portion of the plurality of visual content items, wherein the plurality of training samples is selected based on outputs of the advanced model;

label a plurality of training samples selected from at least a portion of the plurality of visual content items with respective state labels indicating states of the instances of the object shown in the plurality of visual content items; and train a second machine learning model using a training set including the plurality of training samples and the respective state labels, wherein the second machine learning model is trained to classify visual content with respect to states of the object shown in the visual content.

12. The system of claim 11, wherein the system is further configured to:

apply a student model in order to select a plurality of training candidates;

apply a teacher model to the plurality of training candidates, wherein a domain of the student model is a subset of the domain of the teacher model, wherein the teacher model is trained to classify objects shown in visual content;

label the plurality of training candidates based on outputs of the teacher model; and train the basic model using the labeled plurality of training candidates.

13. The system of claim 11, wherein the system is further configured to:

remove at least one portion from the plurality of visual content items, wherein removing the at least one portion includes segmenting the plurality of visual content items, wherein the plurality of training samples is the at least one removed portion.

14. The system of claim 13, wherein the removed at least one portion includes only pixels showing the object.

15. The system of claim 11, wherein the system is further configured to:

determine, via a calibration process, a threshold for the second machine learning model, wherein the second machine learning model is trained to output a confidence score for each classification output by the second machine learning model, wherein the threshold is used to determine whether each classification output by the second machine learning model is to be used during subsequent processing.

16. The system of claim 11, wherein the system is further configured to:

query a language model based on a textual input indicating potential states of the object and the plurality of training samples, wherein the language model is connected to at least one visual foundation model, wherein the language model returns text indicating a state of the object shown in each of the plurality of training samples, wherein the plurality of training samples are labeled with the text returned by the language model.

17. The system of claim 11, wherein the plurality of visual content items is a plurality of first visual content items, wherein the system is further configured to:

apply the second machine learning model to a second visual content item; and determine a state of the object shown in the second visual content item based on outputs of the second machine learning model.

18. The system of claim 11, wherein the object is a door, wherein the state labels include door open and door closed.

* * * * *